United States Patent
Yamasaki

(10) Patent No.: US 7,759,426 B2
(45) Date of Patent: Jul. 20, 2010

(54) POLYANILINE-CONTAINING COMPOSITION AND PROCESS FOR ITS PRODUCTION

(75) Inventor: Hayahide Yamasaki, Soraku-gun (JP)

(73) Assignees: Nippon Shokubai Co., Ltd., Osaka (JP); Denso Corporation, Aichi (JP)

( * ) Notice: Subject to any disclaimer, the term of this patent is extended or adjusted under 35 U.S.C. 154(b) by 346 days.

(21) Appl. No.: 11/885,552

(22) PCT Filed: Mar. 2, 2006

(86) PCT No.: PCT/JP2006/304002
§ 371 (c)(1), (2), (4) Date: Sep. 4, 2007

(87) PCT Pub. No.: WO2006/093234
PCT Pub. Date: Sep. 8, 2006

(65) Prior Publication Data
US 2008/0194763 A1 Aug. 14, 2008

(30) Foreign Application Priority Data
Mar. 4, 2005 (JP) .............................. 2005-060093

(51) Int. Cl.
*C08G 73/02* (2006.01)
(52) U.S. Cl. ...................................... 525/185; 525/190
(58) Field of Classification Search ................. 525/185, 525/190
See application file for complete search history.

(56) References Cited

U.S. PATENT DOCUMENTS

| | | | |
|---|---|---|---|
| 4,962,158 A | 10/1990 | Kobayashi et al. | |
| 5,137,993 A | 8/1992 | Kobayashi et al. | |
| 5,436,796 A | 7/1995 | Abe et al. | |
| 5,993,694 A | 11/1999 | Ito et al. | |
| 6,210,513 B1 * | 4/2001 | Hirata et al. | 156/230 |
| 6,316,563 B2 * | 11/2001 | Naijo et al. | 526/230.5 |
| 6,441,395 B1 | 8/2002 | Yu et al. | |
| 6,521,063 B1 | 2/2003 | Warren et al. | |
| 7,527,853 B2 * | 5/2009 | Asai | 428/212 |
| 2002/0037994 A1 | 3/2002 | Yang | |
| 2002/0038999 A1 | 4/2002 | Cao et al. | |
| 2002/0098377 A1 | 7/2002 | Cao et al. | |
| 2002/0130312 A1 | 9/2002 | Yu et al. | |
| 2004/0016923 A1 | 1/2004 | Yu et al. | |
| 2007/0096066 A1 * | 5/2007 | Yoshida et al. | 252/511 |

FOREIGN PATENT DOCUMENTS

| | | |
|---|---|---|
| JP | 62-135573 | 6/1987 |
| JP | 64-20202 | 1/1989 |
| JP | 64-69621 | 3/1989 |
| JP | 7-86093 | 3/1995 |
| JP | 10-279798 | 10/1998 |
| JP | 2000-256617 | 9/2000 |
| JP | 2002-265781 | 9/2002 |
| JP | 2002-367433 | 12/2002 |
| JP | 2004-500449 | 1/2004 |
| WO | 01/41230 | 6/2001 |

OTHER PUBLICATIONS

Petzold, et al., "An investigation into the nature of the electrochemical and surface properties of polyacrylamides and a study of their adsorption onto the surface of papermaking woodpulps using alternating-current polarography", Makromol. Chem., vol. 192, Issue 12, pp. 2875-2876 (1991) including InterScience abstract thereof.
English translation of Office Action issued Aug. 28, 2009 in the Chinese Patent Application corresponding to the present U.S. application.

* cited by examiner

*Primary Examiner*—Bernard Lipman
(74) *Attorney, Agent, or Firm*—Wenderoth, Lind & Ponack, L.L.P.

(57) ABSTRACT

A polyaniline-containing composition containing a polyaniline component and an emulsion polymer, wherein the emulsion polymer is obtained by caring out emulsion polymerization of a monomer mixture containing a monomer of formula (1):

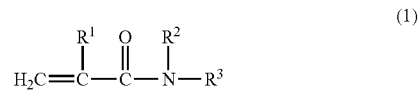

(1)

wherein $R^1$ is a hydrogen atom or a methyl group; and $R^2$ and $R^3$ each independently is a hydrogen atom, an alkyl group having 1 to 12 carbon atoms, and an aryl group having 6 to 20 carbon atoms; or $R^2$ and $R^3$ are combined to form an alkylene group having 1 to 12 carbon atoms or an oxyalkylene group having 1 to 12 carbon atoms, in an amount of not smaller than 15% by mass, relative to a total amount of monomers; and a process for its production.

3 Claims, No Drawings

POLYANILINE-CONTAINING COMPOSITION AND PROCESS FOR ITS PRODUCTION

FIELD OF THE INVENTION

The present invention relates to a polyaniline-containing composition in which a polyaniline component is uniformly dispersed in water or a hydrophilic solvent.

BACKGROUND ART

In particular, polyanilines, which are included in various electrically conductive polymers, have good stability in air, and their applications are considered in various fields. Typical examples of their applications may include cathodes of secondary cells, solid electrolyte capacitors, antistatic materials, transparent electrically conductive films, and electromagnetic wave shielding materials.

In most of these applications, polyanilines are used for coating various materials. In this case, properties required for coated films may include, in addition to conductivity which is the property derived from the polyaniline component, film-forming properties, strength, and flexibility as coated films.

However, in general, polyanilines don't have enough solubility nor dispersibility in water or a hydrophilic solvent, so that when used as a coating composition, it is possible to give only a coating composition containing a small amount of the polyaniline component. Therefore, the coated films formed from such a coating composition have insufficient conductivity, or when the polyaniline component is dispersed forcibly, the resultant coated films have problems such as deteriorated film-forming properties as uniform coated films and insufficient strength and flexibility of the coated films themselves because the state of dispersion is deteriorated.

To solve these problems, there have been proposed a method for obtaining a polyaniline-containing composition having excellent dispersibility by carrying out the oxidative polymerization of an aniline monomer in the presence of an emulsion polymer, and a method of mixing a doped polyaniline component and an emulsion polymer (e.g., see Japanese Patent Laid-open (Kokai) Publications Nos. Shou 64-69621 and No. 2000-256617).

However, in the above methods, the oxidative polymerization of an aniline monomer in the presence of an emulsion polymer is very slow, and it is possible to give only polyanilines having a low molecular weight. Therefore, there are problems that the resultant coated films may have insufficient conductivity and that the coated films formed from the polyaniline-containing composition may have lowered water resistance because a large amount of dopant is required for preparing doped polyanilines which can form a stable mixture with an emulsion polymer.

DISCLOSURE OF THE INVENTION

Under the above circumstances, it is an object of the present invention to provide a polyaniline-containing composition in which a polyaniline component is uniformly dispersed in water or a hydrophilic solvent and which can give coated films exhibiting high electrical conductivity and having sufficient water resistance, strength, and flexibility.

The present inventor has made various studies, and as a result, has found that when a polyaniline-containing composition containing a polyaniline component and an emulsion polymer is produced, a polyaniline-containing composition in which a polyaniline component is uniformly dispersed, together with an emulsion polymer, in water or a hydrophilic solvent can be obtained by carrying out the emulsion polymerization of a monomer mixture containing a monomer of the formula (1) depicted below in an amount of not smaller than 15% by mass, relative to a total amount of monomers, in the presence of a polyaniline component, and that the coated films formed from such a composition can exhibit high electrical conductivity and can have excellent water resistance, strength, and flexibility.

Thus, the present invention provides a polyaniline-containing composition comprising a polyaniline component and an emulsion polymer, wherein the emulsion polymer is obtained by carrying out emulsion polymerization of a monomer mixture containing a monomer of formula (1):

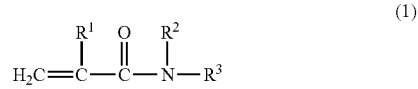

wherein $R^1$ is a hydrogen atom or a methyl group; and $R^2$ and $R^3$ each independently is a hydrogen atom, an alkyl group having 1 to 12 carbon atoms, or an aryl group having 6 to 20 carbon atoms; or R2 and R3 are combined to form an alkylene group having 1 to 12 carbon atoms or an oxyalkylene group having 1 to 12 carbon atoms, in an amount of not smaller than 15% by mass, relative to a total mass of monomers.

The monomer of the above formula (1) may preferably be acryloylmorpholine because the polyaniline component exhibits high dispersibility in water or a hydrophilic solvent.

The above polyaniline component may preferably be an emeraldine-type polyaniline because the coated films formed from the resultant polyaniline-containing composition exhibit high electrical conductivity.

The present invention further provide a process for producing the above polyaniline-containing composition, comprising dissolving or dispersing a polyaniline component in a monomer mixture containing a monomer of the above formula (1) in an amount of not smaller than 15% by mass, relative to a total amount of monomers, and then carrying out emulsion polymerization of the resultant monomer mixture.

In the polyaniline-containing composition of the present invention, the polyaniline component is uniformly dispersed in water or a hydrophilic solvent, so that coated films exhibit high electrical conductivity and, further, it is possible to obtain coated films having excellent water resistance, strength, and flexibility. The polyaniline-containing composition of the present invention may particularly be preferred as a resin composition for optical semiconductor sealing.

BEST MODE FOR CARRYING OUT THE INVENTION

The polyaniline-containing composition of the present invention is a mixture containing at least one polyaniline component and at least one emulsion polymer, and is a dispersion in which the polyaniline component(s) and the emulsion polymer(s) are uniformly dispersed in combination.

In the polyaniline-containing composition of the present invention, the content of the polyaniline component may preferably be not smaller than 0.02% by mass and not greater than 10% by mass, more preferably not smaller than 0.1% by mass and not greater than 8% by mass, and still more preferably not smaller than 0.3% by mass and not greater than 6% by mass. When the content of the polyaniline component is smaller than 0.02% by mass, the coated films formed from the polyaniline-containing composition may have lowered electrical conductivity. In contrast, when the content of the polyaniline component is greater than 10% by mass, the polyaniline component may exhibit deteriorated dispersibility, so that the coated films formed from the polyaniline-containing composition may have lowered strength and flexibility.

As the polyaniline component, common emeraldine-type polyanilines may be preferred. Examples of the emeraldine-type polyanilines may include polyanilines having a basic structure in which a reduced form unit (phenylenediamine structure) and an oxidized form unit (quinonimine structure) are present at a molar ratio of 1:1 as a repeating unit.

In the polyaniline component, the aromatic ring in the polyaniline structure may be substituted at ortho or meta positions. Examples of the substituent group may include an alkyl group having 1 to 20 carbon atoms, an alkoxy group having 1 to 20 carbon atoms, a carboxy ester group having 1 to 20 carbon atoms, an aryl group having 6 to 20 carbon atoms, a cyano group, a sulfone group, and a halogen group.

The polyaniline component may preferably have a weight-average molecular weight (Mw) of not lower than 2,000 and not higher than 500,000, more preferably not lower than 3,000 and not higher than 200,000, and still more preferably not lower than 5,000 and not higher than 100,000. When the polyaniline component has a weight-average molecular weight of smaller than 2,000, the coated films formed from the polyaniline-containing composition may have lowered electrical conductivity. When the polyaniline component has a weight-average molecular weight of higher than 500,000, the polyaniline component may have lowered dispersibility. The weight-average molecular weight is a value obtained in terms of polyethylene oxide by gel permeation chromatography (GPC) The polyaniline component may be produced by any of the heretofore known methods, or a commercially available product may be used. Examples of the commercially available product may include emeraldine-type polyanilines (trade name: PANIPOL PA, available from Panipol Oy).

In the polyaniline-containing composition of the present invention, the emulsion polymer is one obtained by carrying out the emulsion polymerization of a monomer mixture containing at least one monomer of formula (1):

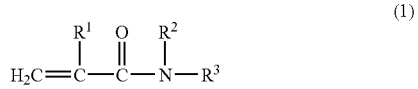

(1)

wherein $R^1$ is a hydrogen atom or a methyl group; and $R^2$ and $R^3$ each independently is a hydrogen atom, an alkyl group having 1 to 12 carbon atoms, or an aryl group having 6 to 20 carbon atoms; or R2 and R3 are combined to form an alkylene group having 1 to 12 carbon atoms or an oxyalkylene group having 1 to 12 carbon atoms, in an amount of not smaller than 15% by mass, relative to a total amount of monomers.

In the polyaniline-containing composition of the present invention, the content of the emulsion polymer may preferably be not smaller than 10% by mass and not greater than 60% by mass, more preferably not smaller than 15% by mass and not greater than 50% by mass, and still more preferably not smaller than 20% by mass and not greater than 40% by mass. When the content of the emulsion polymer is smaller than 10% by mass, the polyaniline-containing composition may have deteriorated film-forming property, so that uniform coated films cannot be obtained in some cases. In contrast, when the content of the emulsion polymer is greater than 60% by mass, the polyaniline-containing composition may have high viscosity, thereby lowering workability.

In the monomer of the above formula (1), substituent groups $R^2$ and $R^3$ may preferably be not crosslinkable functional groups to achieve excellent stability of polymerization reaction and storage stability of the composition. Specific examples of the monomer of the above formula (1) may include (meth)acrylamide, N-methyl-(meth) acrylamide, N-ethyl(meth)acrylamide, N-isopropyl-(meth) acrylamide, N-N-butyl(meth)acrylamide, N-t-butyl-(meth) acrylamide, N,N-dimethyl(meth)acrylamide, N,N-diethyl(meth) acrylamide, N,N-di-n-butyl(meth)acrylamide, N-(1,1'-dimethyl-2-phenyl)ethyl(meth)acrylamide, N-di-phenylmethyl (meth) acrylamide, N-cyclohexyl(meth)acryl-amide, N-(1-methylbutyl)(meth)acrylamide, and (meth)-acryloylmorpholine. In these monomers, N,N-dimethyl-(meth) acrylamide, N,N-diethyl(meth)acrylamide, N,N-di-n-butyl (meth)acrylamide, and (meth)acryloylmorpholine may be preferred, and (meth)acryloylmorpholine may particularly be preferred because the polyaniline component may have improved dispersibility.

In the preparation of the emulsion polymer, the amount of the monomer of the above formula (1) to be used is not smaller than 15% by mass, preferably not smaller than 15% by mass and not greater than 80% by mass, more preferably not smaller than 18% by mass and not greater than 60% by mass, and still more preferably not smaller than 20% by mass and not greater than 40% by mass, relative to a total amount of monomers. When the amount of the monomer of the above formula (1) to be used is smaller than 15% by mass, the polyaniline component may have lowered dispersibility. In contrast, when the amount of the monomer of the above formula (1) to be used is greater than 80% by mass, the coated films formed from the polyaniline-containing composition may have lowered water resistance.

When the emulsion polymer is prepared, at least one monomer having an acid group may preferably be used in combination with the monomer of the above formula (1) to provide the polyaniline component with properties such as electrical conductivity by doping.

As the monomer having an acid group, preferred are, for example, a monomer having a carboxyl group, a monomer having a sulfone group, and a monomer having a phosphoric acid group. Specific examples of the monomer having an acid group may include (meth)acrylic acid, 2-acrylamido-2-methylpropane sulfinic acid, methallylsulfonic acid, 3-sulfopropyl (meth)acrylate, and 2-(meth)acryloyloxyethyl acid phosphate.

In the preparation of the emulsion polymer, the amount of the monomer having an acid group to be used may preferably be not smaller than 0.5% by mass and not greater than 30% by mass, more preferably not smaller than 1% by mass and not greater than 20% by mass, and still more preferably not smaller than 2% by mass and not greater than 10% by mass, relative to a total amount of monomers. When the amount of the monomer having an acid group to be used is smaller than 0.5% by mass, the polyaniline component may exhibit low doping efficiency, so that the coated films formed from the polyaniline-containing composition may have lowered electrical conductivity. In contrast, when the amount of the monomer having an acid group to be used is greater than 30% by mass, the coated films formed from the poly-aniline-containing composition may have lowered water resistance.

In the preparation of the emulsion polymer, at least one non-water-soluble monomer may preferably be used in combination with the monomer of the above formula (1) and a monomer having an acid group to carry out emulsion polymerization efficiently. The term "non-water-soluble monomer" means a monomer having a water solubility at 20° C. of smaller than 10 g/100 mL.

Specific examples of the non-water-soluble monomer may include (meth)acrylates such as methyl (meth)acrylate, ethyl (meth)acrylate, butyl (meth)acrylate, 2-ethylhexyl (meth)acrylate, lauryl (meth)acrylate, propyl (meth)-acrylate, cyclohexyl (meth)acrylate, isobornyl (meth)-acrylate, dicyclopentenyloxyethyl (meth)acrylate, phenoxyethyl (meth) acrylate, and 1,6-hexanediol di(meth)-acrylate; and vinylbenzenes such as styrene, α-methyl-styrene, vinyltoluene, and divinylbenzene.

In the preparation of the emulsion polymer, the amount of the non-water-soluble monomer to be used may preferably be not smaller than 30% by mass and not greater than 90% by mass, more preferably not smaller than 40% by mass and not greater than 80% by mass, and still more preferably not smaller than 50% by mass and not greater than 70% by mass, relative to a total amount of monomers. When the amount of the non-water-soluble monomer to be used is smaller than 30% by mass, it may become difficult to carry out emulsion polymerization, so that the emulsion polymer cannot be obtained in some cases. In contrast, when the amount of the non-water-soluble monomer to be used is greater than 90% by mass, the polyaniline component may have lowered dispersibility.

Besides the monomer of the above formula (1), the monomer having an acid group and the non-water-soluble monomer, at least one other monomer may be used as the monomer constituting the emulsion polymer. The kind and amount of the other monomer to be used may suitably be adjusted according to properties required for the coated films formed from the polyaniline-containing composition, although they are not particularly limited.

Specific examples of the other monomer may include 2-hydroxyethyl (meth)acrylate, hydroxypropyl (meth)-acrylate, hydroxybutyl (meth)acrylate, ethylene glycol di(meth)acrylate, diethylene glycol di(meth)acrylate, and triethylene glycol di(meth)acrylate.

As a process for producing the polyaniline-containing composition of the present invention, preferred is a process comprising dissolving or dispersing at least one polyaniline component in a monomer mixture containing at least one monomer of the above formula(1) and, if necessary, at least one monomer having an acid group, at least one non-water-soluble monomer, and at least one other monomer, and then carrying out emulsion polymerization because the polyaniline component may have improved dispersibility and therefore the coated films formed from the polyaniline-containing composition may improved electrical conductivity.

In case where the polyaniline component is dissolved or dispersed in the monomer mixture containing the monomer of the above formula (1) and, if necessary, the monomer having an acid group, the non-water-soluble monomer, and the other monomer, an undoped polyaniline component which has not been doped in advance before being dissolved or dispersed may preferably be used as the polyaniline component because the polyaniline component may have improved dispersibility. That is, doping may occur when the polyaniline component is being dissolved or dispersed in the monomer mixture for preparing the emulsion polymer, and the polyaniline component is then changed from an insulating material to an electrical conductive material.

It is preferred to dissolve or disperse the polyaniline component while the mixture is stirred in an apparatus which can achieve high-speed stirring, such as a homogenizer or a homomixer.

As the emulsion polymerization method for preparing the emulsion polymer, there can be used any of the methods usually used in the emulsion polymerization, examples of which may include a simultaneous monomer addition, a dropwise monomer addition, a pre-emulsification, a power feeding, a seed polymerization, a multi-step monomer addition.

The conditions, such as temperature and period, of the polymerization reaction may suitable be selected, although they are not particularly limited. The polymerization may preferably be carried out under a nitrogen atmosphere, and further with the addition of a chain transfer agent for making the adjustment of the average molecular weight of the polymer.

As an emulsifying agent(s) to be used in the emulsion polymerization, preferred are nonionic emulsifying agents because micelles can stably be retained, and further emulsifying agents having an aromatic ring in the molecule structure because they have high affinity with the polyaniline component.

Specific examples of the emulsifying agent to be used in the emulsion polymerization may include NONIPOL series, Eleminol SCZ-35, Eleminol STN-6, STN-8, STN-13, STN-20 and STN-45 (all available from Sanyo Chemical Industries, Ltd.); Emulgen A-60, A-66, and A-90 (all available from Kao Corporation); Noigen EA-157, EA-167, and EA-177, and Aqualon RN-10, RN-20, RN-30, and RN-50 (all available from Dai-Ichi Kogyo Seiyaku Co Ltd.).

The emulsifying agent may preferably have a HLB (hydrophile-lipophile balance) of not lower than 13 and not higher than 17, more preferably not lower than 14 and not higher than 17, and still more preferably not lower than 15 and not higher than 17. When the emulsifying agent has a HLB within the above range, the polyaniline component may have improved stability in the polyaniline-containing composition. The term "HLB" is an index indicating the degrees of hydrophilicity and lipophilicity of a surfactant, and can be calculated by the Griffin equation represented by HLB= (weight fraction of polyoxyethylene parts)/5 in the case of an ethylene oxide-type nonionic surfactant, and HLB=20×(1− (saponification value of polyhydric alcohol ester)/(neutralization number of fatty acid)) in the case of a polyhydric alcohol-type nonionic surfactant.

The amount of the emulsifying agent to be used may preferably be not smaller than 1 part by mass and not greater than 20 parts by mass, more preferably not smaller than 3 parts by mass and not greater than 18 parts by mass, and still more preferably not smaller than 5 parts by mass and not greater than 15 parts by mass, relative to 100 parts by mass of the monomer mixture. When the amount of the emulsifying agent to be used is smaller than 1 part by mass, the stability of emulsion polymerization may become insufficient. In contrast, when the amount of the emulsifying agent to be used is greater than 20 parts by mass, the coated films formed from the polyaniline-containing composition may have lowered water resistance.

As a polymerization initiator(s) to be used in the emulsion polymerization, azo-type polymerization initiators may be preferred because there is less possibility that the polyaniline component is oxidized. Specific examples of the azo-type polymerization initiators may include water-soluble azo compounds such as 2,2'-azobis(2-amidinopropane) dihydrochloride, 4,4'-azobis(4-cyanovaleric acid), 2,2'-azobis[2-(5-methyl-2-imidazoline-2-yl)propane]dihydrochloride, 2,2'- azobis [2-(2-imidazoline-2-yl)propane]dihydrochloride, 2,2'-azobis[2-(2-imidazoline-2-yl)propane]disulfate dihydrate, 2,2'-azobis[N-(2-carboxyethyl)-2-methylpropionamide], 2,2'-azobis{2-[1-(2-hydroxyethyl)-2-imidazoline-2-yl]-propane}dihydrochloride, and 2,2'-azobis[2-(2-imidazoline-2-yl)propane].

The amount of polymerization initiator to be used may preferably be not smaller than 0.1 parts by mass and not greater than 5 parts by mass, more preferably not smaller than 0.5 parts by mass and not greater than 3 parts by mass, and still more preferably not smaller than 0.7 parts by mass and not greater than 2 parts by mass, relative to 100 parts by mass of the monomer mixture. When the amount of polymerization initiator to be used is smaller than 0.1 parts by mass, emulsion polymerization cannot proceed in some cases, so that the monomers may remain, thereby lowering the strength and flexibility of the coated films formed from the polyaniline-containing composition. In contrast, when the amount of the polymerization initiator to be used is greater than 5 parts by mass, the emulsion polymerization may have lowered stability.

The polyaniline-containing composition of the present invention may preferably contain inorganic fine particles. The addition of inorganic fine particles can suppress the autoagglutinating property of the polyaniline component, so that the polyaniline-containing composition may have improved storage stability.

The inorganic fine particles to be added to the polyaniline-containing composition of the present invention may preferably have a specific surface area of 50 $m^2/g$ or greater, more preferably 100 $m^2/g$ or greater, and still more preferably 150 $m^2/g$ or greater. When the inorganic fine particles have a specific surface area of smaller than 50 $m^2/g$, the polyaniline component may be aggregated with time, thereby lowering the storage stability of the polyaniline-containing composition.

The inorganic fine particles may preferably have an average primary particle diameter of 50 nm or smaller, more preferably 30 nm or smaller, and still more preferably 20 nm or smaller. When the average primary particle diameter of the inorganic fine particles is greater than 50 nm, the polyaniline component may be aggregated with time, thereby lowering the storage stability of the polyaniline-containing composition.

Examples of the material constituting the inorganic fine particles may include silica, alumina, zircon, titanium oxide, silicon carbide, silicon nitride, boron carbide, boron nitride, and carbon. In these inorganic compounds, inorganic oxides such as silica, alumina, zircon, and titanium oxide may be preferred, and silica may particularly be preferred, because the polyaniline component in the polyaniline-containing composition may have improved stability.

Examples of the silica fine particles may include fumed silica and colloidal silica, specific examples of which may include Aerosil (trade name, available from Nippon Aerosil Co., Ltd.) and Rheoloseal (trade name, available from Tokuyama Corp.).

The content of the inorganic fine particles in the polyaniline-containing composition of the present invention may preferably be not smaller than 0.01 parts by mass and not greater than 5 parts by mass, more preferably not smaller than 0.05 parts by mass and not greater than 3 parts by mass, and still more preferably not smaller than 0.1 parts by mass and not greater than 1 part by mass, relative to 100 parts by mass of the emulsion polymer. When the content of the inorganic fine particles is smaller than 0.01 parts by mass, the effect of suppressing the aggregation of the polyaniline component may become small, so that the storage stability of the polyaniline-containing composition may become lowered. In contrast, when the content of the inorganic fine particles is greater than 5 parts by mass, the coated films formed from the polyaniline-containing composition may have lowered strength and flexibility.

The polyaniline-containing composition of the present invention may contain, if necessary, at least one other compound and additive.

Examples of the other compound and additive may include water, solvents, antioxidants, ultraviolet absorbers, ultraviolet stabilizers, plasticizers, leveling agents, and repulsion inhibitors.

The amounts of the other compound and additive to be contained is not particularly limited, so long as they are within a range that does not impair the advantageous effects of the present invention, but may preferably, for example, within a range of not smaller than 0.01% by mass and not greater than 90% by mass.

EXAMPLES

The present invention will be explained below in detail by reference to Examples, but the present invention is not limited to these Examples. The present invention can be put into practice after appropriate modifications or variations within a range meeting the gists described above and later, all of which are included in the technical scope of the present invention. In Examples below, "part(s) by mass" and "% by mass" may be abbreviated as "part(s)" and "%", respectively, for convenience.

Example 1

As a polyaniline component, 2.0 parts of an emeraldine-type polyaniline (trade name: PANIPOL PA, available from Panipol Oy; weight average molecular weight: 82,700) was uniformly dissolved in a mixture of 20 parts of acryloylmorpholine as the monomer of the above formula (1) and 5.0 parts of styrene to obtain a blue-violet polyaniline solution. The solution was added dropwise to a mixture of 20 parts of styrene, 15 parts of butyl acrylate, and 5.0 parts of acrylic acid, while the mixture was stirred with a homogenizer, to give a dark green monomer mixture in which polyaniline was dispersed uniformly.

Then, a reactor equipped with a thermometer, a condenser tube, a nitrogen-supply tube, a dropping funnel, and a stirrer was charged with 140 parts of ion-exchange water and 3.0 parts of polyoxyethylene styrenated phenyl ether (trade name: Noigen EA-167, available from Dai-Ichi Kogyo Seiyaku Co Ltd.; HLB: 14.8) as an emulsifying agent, and the mixture was dissolved with stirring under a nitrogen gas blow. The monomer mixture was placed in the dropping funnel, and one tenth of it was added dropwise to the reactor. Then, 6.0 parts of a 10% aqueous solution of 2,2'-azobis(2-amidinopropane) dihydrochloride salt was added thereto. After polymerization reaction at 70° C. for 30 minutes, the remaining monomer mixture was added dropwise thereto over 4 hours. After completion of the dropwise addition, the polymerization reaction was further carried out at the same temperature for another 1 hour to give a polyaniline-containing composition (1) having a nonvolatile content of 32% and a polyaniline content of 0.9%.

Example 2

In the same manner as described in Example 1, 2.0 parts of an emeraldine-type polyaniline (trade name: PANIPOL PA, available from Panipol Oy; weight average molecular weight: 82,700) was uniformly dissolved in a mixture of 10 parts of acryloylmorpholine, 5.0 parts of styrene, and 1.5 parts of ion-exchange water to give a blue-violet polyaniline solution. The solution was added dropwise to a mixture of 10 parts of styrene, 10 parts of butyl acrylate, and 4.0 parts of acrylic acid, while the mixture was stirred with a homogenizer, to give a dark green monomer mixture in which polyaniline was dispersed uniformly.

Then, in the same manner as described in Example 1, 140 parts of ion-exchange water and 3.0 parts of polyoxyethylene styrenated phenyl ether (trade name: Noigen EA-177, available from Dai-Ichi Kogyo Seiyaku Co Ltd.; HLB: 15.6) as an emulsifying agent were fed to a reactor, and the mixture was dissolved with stirring under a nitrogen gas blow. The monomer mixture was placed in a dropping funnel, and one tenth of it was added dropwise to the reactor. Then, 6.0 parts of a 10% aqueous solution of 2,2'-azobis [2-(2-imidazoline-2-yl) propane]dihydrochloride salt was added thereto. After polymerization reaction at 53° C. for 30 minutes, the remaining monomer mixture was added dropwise thereto over 4 hours. After completion of the dropwise addition, the polymerization reaction was further carried out at the same temperature for another 1 hour, to give a polyaniline-containing composition (2) having a nonvolatile content of 24% and a polyaniline content of 1.1%.

Example 3

In the same manner as described in Example 1, 2.0 parts of an emeraldine-type polyaniline (trade name: PANIPOL PA, available from Panipol Oy; weight average molecular weight: 82,700) was uniformly dissolved in a mixture of 20 parts of N,N-diethyl(meth)acrylamide and 5.0 parts of styrene. The solution was added dropwise to a mixture of 20 parts of styrene, 15 parts of butyl acrylate, and 4.0 parts of 2-(meth) acryloyloxyethyl acid phosphate (trade name: RIGHT-ESTER P-1M, available from KYOEISHA CHEMICAL Co., LTD.) to give a dark green monomer mixture in which polyaniline was dispersed uniformly. Using the monomer mixture, the polymerization reaction was carried out in the same manner as described Example 1 to give a polyaniline-containing composition (3) having a nonvolatile content of 32% and a polyaniline content of 0.9%.

Example 4

In the same manner as described in Example 1, 2.0 parts of an emeraldine-type polyaniline (trade name: PANIPOL PA, available from Panipol Oy; weight average molecular weight: 82,700) was uniformly dissolved in a mixture of 20 parts of acryloylmorpholine and 5.0 parts of styrene. The solution was added dropwise to a mixture of 20 parts of styrene, 15 parts of 2-ethylhexyl acrylate, 2.0 parts of 2-(meth)acryloyloxyethyl acid phosphate (trade name: RIGHT-ESTER P-1M, available from KYOEISHA CHEMICAL Co., LTD.), and 2.0 parts of 2-acrylamido-2-methyl propane sulfonate to give a dark green monomer mixture in which polyaniline was dispersed uniformly. Using the monomer mixture, the polymerization reaction was carried out in the same manner as described in Example 1 to give a polyaniline-containing composition (4) having a nonvolatile content of 32% and a polyaniline content of 0.9%.

Example 5

In the same manner as described in Example 1, 2.0 parts of an emeraldine-type polyaniline (trade name: PANIPOL PA, available from Panipol Oy; weight average molecular weight: 82,700) was uniformly dissolved in a mixture of 20 parts of acryloylmorpholine, and 5.0 parts of 2-hydroxy acrylate. The solution was added dropwise to a mixture of 20 parts of styrene, 15 parts of butyl acrylate, 3.0 parts of acrylic acid, 2.0 parts of 2-(meth)acryloyloxyethyl acid phosphate (trade name: RIGHT-ESTER P-1M, available from KYOEISHA CHEMICAL Co., LTD.) to give a dark green monomer mixture in which polyaniline was dispersed uniformly. Using the monomer mixture, the polymerization reaction was carried out in the same manner as described in Example 1 to give a polyaniline-containing composition (5) having a nonvolatile content of 32% and a polyaniline content of 0.9%.

Reference Example 1

A reactor, which was the same as used in Example, was charged with 140 parts of ion-exchange water and 3.0 parts of polyoxyethylene styrenated phenyl ether (trade name: Noigen EA-167, available from Dai-Ichi Kogyo Seiyaku Co., Ltd.; HLB: 14.8) as an emulsifying agent, and the mixture was dissolved with stirring under a nitrogen gas blow. A monomer mixture containing 20 parts of styrene, 15 parts of butyl acrylate, and 5.0 parts of acrylic acid was placed in the dropping funnel, and one tenth of it was added dropwise to the reactor. Then, 6.0 parts of a 10% aqueous solution of 2,2'-azobis(2-amidino propane dihydrochloride) salt was added thereto. After polymerization reaction at 70° C. for 30 minutes, the remaining monomer mixture was added dropwise thereto over 4 hours. After completion of the dropwise addition, the polymerization reaction was further carried out at the same temperature for another 1 hour to give an emulsion composition (R1) having a nonvolatile content of 23%.

Comparative Example 1

Ten parts of 12 N hydrochloric acid and 4 parts of aniline were dissolved in 150 parts of the emulsion composition (R1) obtained in Reference Example 1. Then, an aqueous oxidant solution in which 11.4 parts of ammonium persulfate was dissolved in 100 parts of ion-exchange water was prepared. After cooled to 5° C., these two solutions were mixed and allowed to react with stirring for 8 hours to give a polyaniline-containing composition (C1) having a nonvolatile content of 14% and a polyaniline content of 1.3%. The reaction rate of the oxidative polymerization of aniline in the reaction was 80%.

Comparative Example 2

Ten parts of p-toluenesulfonate was dissolved in 150 parts of ion-exchange water, to which 1.5 parts of sulfuric acid and 2.5 parts of aniline were added, and the mixture was cooled to 0° C. A solution obtained by dissolving 5.5 parts of ammonium persulfate in 50 parts of ion-exchange water was cooled to 0° C. and then added dropwise for 15 minutes. At a temperature of 0° C., the mixture was further stirred for 20 hours. The mixture was then concentrated by ultrafiltration to give a polyaniline solution having a nonvolatile content of 38% and a polyaniline content of 5.0%.

Further, 100 parts of the polyaniline solution and 100 parts of the emulsion composition (R1) of Reference Example 1 were mixed to give a polyaniline-containing composition (C2) having a nonvolatile content of 32% and a polyaniline content of 2.5%.

Evaluation Method

The polyaniline-containing compositions (1) to (5) obtained in Examples 1 to 5 and the polyaniline-containing compositions (C1) to (C2) obtained in Comparative Examples 1 to 2 were evaluated by the following methods. The results of the evaluation are shown in Table 1.

(a) Surface Resistance

A coated film having a thickness of 2 μm was formed by coating a sample polyaniline-containing composition on a glass plate with a bar coater, followed by drying the coated film, and the surface resistance of each coated film was determined according to JIS-K6911.

(b) Water Resistance

A coated film having a thickness of 2 μm was formed by coating a sample polyaniline-containing composition on an aluminum plate with a bar coater, followed by drying the coated film. The test plate was immersed in ion-exchange water at 25° C.±3° C. for 3 days, and the appearance of the coated film was evaluated by visual observation according to the following criteria:

○: No abnormalities were observed in the coated film;
Δ: Partial blisters were observed in the coated film;
×: A broken part or parts were observed in the coated film.

(c) Pencil Hardness

A coated film having a thickness of 2 μm was formed by coating a sample polyaniline-containing composition on an aluminum plate with a bar coater, followed by drying the coated film, and the pencil hardness of each coated film was determined according to JIS-K6911.

ductivity and insufficient water resistance, strength, and flexibility because of an influence of the remaining aniline monomer. Furthermore, the polyaniline-containing composition of Comparative Example 2 was prepared by using a great amount of dopant, and therefore, coated film exhibited high electrical conductivity, but had insufficient water resistance, strength, and flexibility.

INDUSTRIAL APPLICABILITY

The polyaniline-containing composition of the present invention contains a polyaniline component dispersed uniformly in water or a hydrophilic solvent, and the resultant coated films exhibit a high electrical conductivity, and further have sufficient water resistance, strength, and flexibility. Therefore, the polyaniline-containing composition of the present invention can effectively be used for applications such as cathodes of secondary cells, solid electrolyte capacitors, antistatic materials, transparent conductive films, and electromagnetic wave shielding materials.

The invention claimed is:

1. A polyaniline-containing composition comprising a polyaniline component and an emulsion polymer, wherein the emulsion polymer is obtained by carrying out emulsion polymerization of a monomer mixture containing acryloylmorpholine in an amount of not smaller than 15% by mass, relative to a total amount of monomers.

2. A polyaniline-containing composition according to claim 1, wherein the polyaniline component is an emeraldine-type polyaniline.

TABLE 1

|  |  | Example 1 | Example 2 | Example 3 | Example 4 | Example 5 | Comp. Ex. 1 | Comp. Ex. 2 |
|---|---|---|---|---|---|---|---|---|
| Polyaniline-containing composition | | (1) | (2) | (3) | (4) | (5) | (C1) | (C2) |
| Coated film | Surface resistance (Ω/cm²) | $4.3 \times 10^6$ | $4.1 \times 10^6$ | $2.5 \times 10^6$ | $1.0 \times 10^6$ | $3.5 \times 10^6$ | $6.5 \times 10^9$ | $5.3 \times 10^6$ |
| | Water resistance | ○ | ○ | ○ | ○ | ○ | Δ | X |
| | Pencil hardness | H | HB | H | H | H | 2B | B |

As can be seen from Table 1, the polyaniline-containing compositions of Examples 1 to 5 were able to provide uniform film formation because polyaniline was uniformly dispersed therein, and the resultant coated films exhibited high electrical conductivity and retained sufficient properties such as water resistance, strength, and flexibility.

In contrast, the polyaniline-containing composition of Comparative Example 1 was deteriorated in the state of dispersion of polyaniline, and the degree of polymerization of aniline was low, so that coated film had low electrical con- 3. A process for producing a polyaniline-containing composition according to claim 1, comprising dissolving or dispersing a polyaniline component in a monomer mixture containing acryloylmorpholine in an amount of not smaller than 15% by mass, relative to a total amount of monomers, and then carrying out emulsion polymerization of a resultant monomer mixture.

* * * * *